United States Patent [19]

Brouwer

[11] 4,252,234
[45] Feb. 24, 1981

[54] PRESSURE SUPPORT FOR PLURAL CABLE CONVEYOR DRIVE

[75] Inventor: Gerald A. Brouwer, Grandville, Mich.

[73] Assignee: Lear Siegler, Inc., Grand Rapids, Mich.

[21] Appl. No.: 49,319

[22] Filed: Jun. 18, 1979

[51] Int. Cl.³ ............................................. B65G 13/07
[52] U.S. Cl. .................................................... 198/790
[58] Field of Search ............... 198/780, 782, 784, 789, 198/790, 791, 814, 817, 842, 843, 866; 226/190, 191, 194; 74/230.3

[56] References Cited

U.S. PATENT DOCUMENTS

| 2,759,594 | 8/1956 | Kleboe et al. | 198/817 X |
| 3,010,565 | 11/1961 | Pasinski | 226/194 X |
| 4,039,074 | 8/1977 | Maxted | 198/786 X |
| 4,108,304 | 8/1978 | McKnight et al. | 198/790 X |

Primary Examiner—James L. Rowland
Attorney, Agent, or Firm—Price, Heneveld, Huizenga & Cooper

[57] ABSTRACT

A floating support for a pair of parallel conveyor propelling members provides propelling member supporting sheaves mounted in pairs at each end of a bracket. The bracket is seated on a plurality of resilient elements such as compression springs, each of which is free for independent reaction permitting the bracket to tilt either laterally or lengthwise of the propelling members to provide uniform pressure against them at each of the sheaves.

12 Claims, 7 Drawing Figures

U.S. Patent — Feb. 24, 1981 — 4,252,234
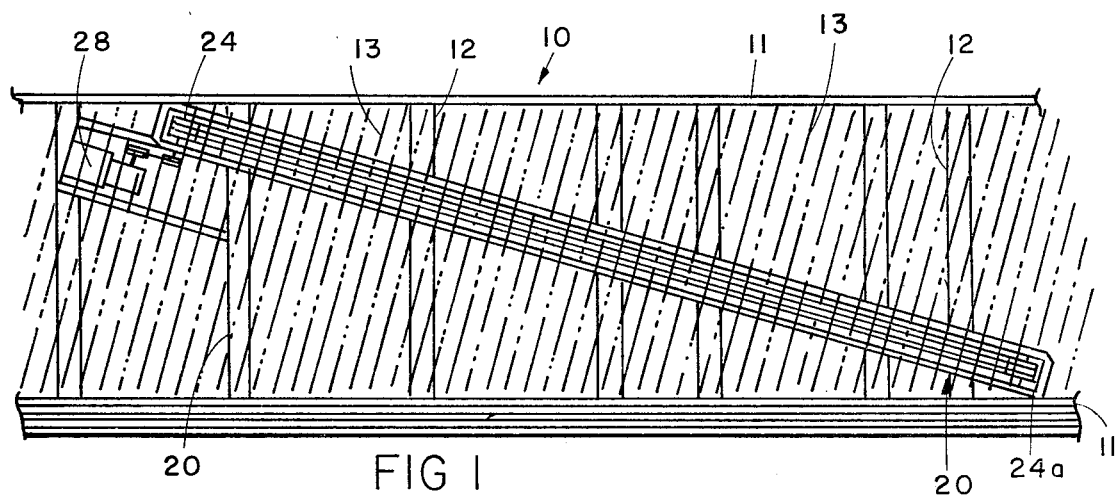
FIG 1
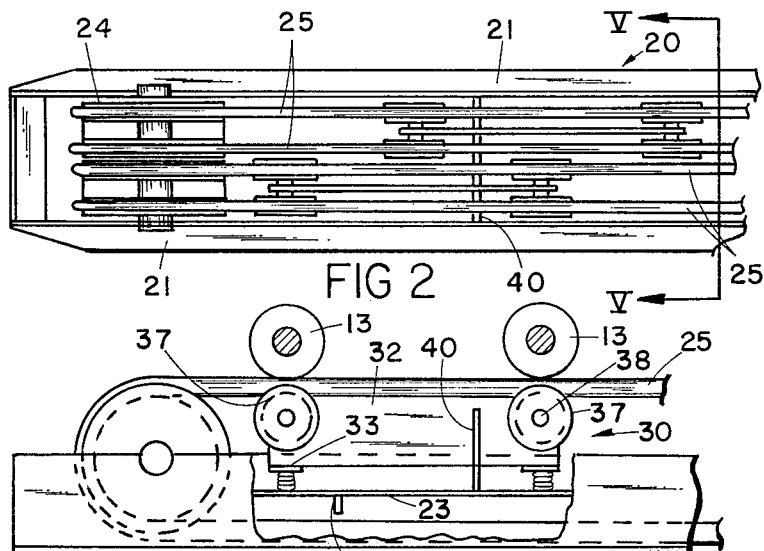
FIG 2
FIG 3
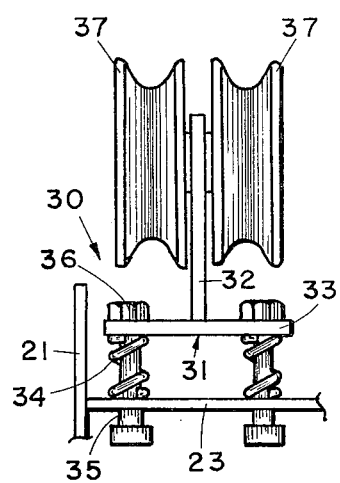
FIG 4
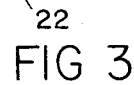
FIG 7
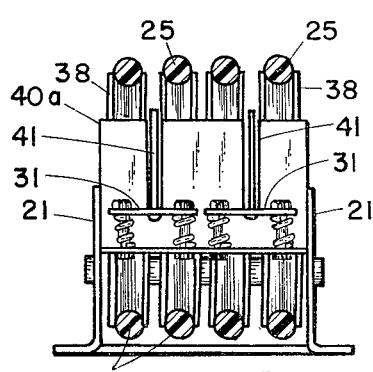
FIG 5
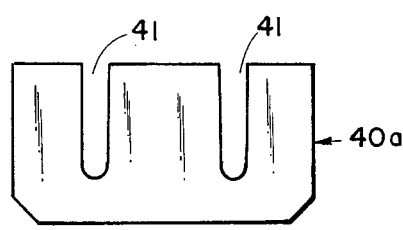
FIG 6

PRESSURE SUPPORT FOR PLURAL CABLE CONVEYOR DRIVE

BACKGROUND OF THE INVENTION

In a number of applications in the conveyor field, it has been found desirable to utilize two parallel propelling members to provide the driving force for moving the articles along the conveyor. In many specialized applications it has been found essential that the propelling member be of circular cross-section to reduce wear to an acceptable level and to solve the problem of maintaining proper tracking of the propelling members. Further, in certain type of applications, particularly where the rollers are skewed with respect to the principle axis of the conveyor, it has been found that only propelling members of circular cross-section can be utilized. To assure a high degree of fail-safe operation, it is considered desirable to utilize the propelling members in pairs so that the loss of one will not render the conveyor inoperative. When the propelling members are utilized in pairs, a serious problem has been encountered in maintaining proper support for the propelling members so that they exert reasonably identical bearing pressure against the conveyor rollers or against the articles to be conveyed. Also, provision must be made to assure adequate support pressure for the remaining propelling member when one of them breaks.

BRIEF DESCRIPTION OF THE INVENTION

The invention provides a bracket which effects an automatic adjustment and equalization of the bearing pressure applied by each of the individual propelling members. This is done by providing a bracket which is resiliently mounted so that it may rock or tilt both normal and parallel to the axes of the propelling members and, thus, automatically balance the application of force between the propelling members to maintain a high degree of uniformity. Further, if there are variations in the thickness of the propelling members, the float characteristics of the bracket permit the bracket to rock or tilt in response to the differentials in thickness and, thus, maintain a substantially uniform pressure on both propelling members at all times. The invention also provides a means for automatically limiting the angular tilt of the bracket when one of the two propelling members breaks.

BRIEF DESCRIPTION OF THE DRAWINGS

FIG. 1 is a partially schematic, fragmentary plan view of the conveyor equipped with this invention illustrating the article transport rollers as phantom lines for the sake of clarity; and FIG. 2 is an enlarged, fragmentary plan view of the propelling member track equipped with this invention; and FIG. 3 is a fragmentary, partially broken, side elevational view of the track; and FIG. 4 is an enlarged end elevational view of one of the brackets; and FIG. 5 is an enlarged sectional elevational view taken along the plane V—V of FIG. 2; and FIG. 6 is an enlarged plan view of the bracket for mounting this invention; and FIG. 7 is an elevational view of the tilt control plate for the bracket.

DESCRIPTION OF THE PREFERRED EMBODIMENT

Referring specifically to FIG. 1, the numeral 10 indicated a conveyor having a pair of side frame members 11 joined by cross members 12. Article conveying rollers 13 are mounted between the side frame members 11 at an oblique angle to the primary axis of the conveyor and to the side frame members 11. For the sake of clarity, the rollers are illustrated schematically in FIG. 1.

Beneath the rollers 13 and supported on the cross members 12 is a drive frame 20. The drive frame 20, as is best seen in FIGS. 2 and 5, has a pair of side members 21 interconnected at suitable intervals by cross pieces 22. A base plate 23 is mounted on top of the cross pieces 22. A drive pulley 24 is mounted at one end of the drive frame and an idler pulley 24a is mounted at the opposite end. As illustrated, each of the pulleys 24 and 24a has four circumferential channels to mount four individual endless propelling members 25. The pulleys 24 and 24a are so mounted that the propelling members 25 do not quite contact the rollers 13 immediately above them. This is intentional because the pulleys 24 and 24a are vertically stationary and cannot float as to the remaining propelling member supports about to be described. The propelling members preferably are equally spaced apart laterally of the conveyor. While the propelling members may be of any one of several types, in the particular construction illustrated, they are of circular cross section and constitute an endless loop of a stretchable polyurethane. The polyurethane propelling members are both stretchable and elastic eliminating the need for a take-up. Also, because the particular application to which this invention is illustrated as being applied, that is, to a conveyor having skewed rollers, it is necessary that the propelling members be of circular cross section. It will be recognized that other types of propelling members such as a nylon coated cable or a circular reinforced or nonreinforced rubber propelling member can be substituted. However, the polyurethane type of material is preferred because to replace a propelling member, it is only necessary to provide a length of the polyurethane material and heat weld the ends together on the machine. This is not possible with the rubber type of propelling member and is vastly simpler than the type of splice necessary when a plastic coated, metallic cable is utilized. Further, in the case of the latter type of propelling member, a take-up mechanism must be provided. One of the end pulleys is driven by any suitable means such as the prime mover and gear reducer 28. This also is supported on the cross members 12. Such a drive is conventional and, therefore, not illustrated.

The drive frame 20 is inclined to the axis of the conveyor and is normal to the article transporting conveyor rollers 13. Thus, the propelling members 25 are normal to the axis of the rollers for efficiency of operation and to reduce wear.

To position the propelling members 25 where they will positively make driving contact with the rollers 13, it is necessary to hold the propelling members from beneath so that they are pressed against the bottoms of the rollers 13. The support members 30 are provided for this purpose. Each of the support members has a bracket 31 with an elongated upstanding center member or element 32. Each end of the center member 32 has a foot plate or a cross piece 33. Each cross piece extends laterally on both sides of the center member 32 at the bottom of the center member. This provides support four feet for the bracket 31. Each foot is supported on a resilient, compression spring 34. The compression springs seat on the upper surface of the plate 23. Extending through each spring 34 is a guide post 35 which may be a bolt extending upwardly through the plate 23, the spring 34 and the foot piece are secured by a nut 36. The head of the guide post 35 is normally spaced below the plate 23 to accommodate vertical movement of the bracket. In effect, each bracket 31 floats on the four springs. Its upward movement in response to the springs is limited by the head of the guide member 35.

Mounted at each end of the center member of the bracket is a pair of pulleys or sheaves 37. The sheaves are mounted, one on each side of the center member 32 by means of a suitable stud shaft 38. The spacing between the sheaves is equal to that between the pair of propelling members supported by the bracket.

The length of the springs 34 is selected to support the bracket such that the sheaves 36 press the propelling members 25 upwardly against the bottoms of the conveyor rollers 13 with sufficient force that the motion of the propelling members will be effectively and efficiently transferred to the rollers 25 for moving the article. Because each bracket 32 floats on its springs it will be recognized that variations in the thickness of the individual propelling members or actual other factors which might otherwise vary the degree of frictional contact between the propelling members and the rollers will be compensated by the rocking of the bracket laterally with respect to the axis of the propelling members. Since the brackets are free to rock crosswise and to pivot lengthwise, they are free to adjust to all types of variations in the thickness of the propelling members. Further, should one of the propelling members break, the bracket 32, by reason of the springs, will continue to press the remaining propelling member against the rollers 13 thus continuing the effective operation of the conveyor.

To limit excessive lateral or side rocking motion of the brackets, a stabilizer fork 40 is used. The stabilizer fork 40 is rigidly secured to the brakcet intermediate the ends of the bracket and provides an upwardly opening slot 41 centered about the center member. The slot 41 is substantially wider than the thickness of the center member, thus permitting a limited degree of lateral rock of the center member before the side walls of the slot prevent further rocking motion. The width of the slot is governed by the amount of rocking motion desired and this in turn is basically limited to the amount necessary to assure effective engagement between the remaining propelling member 25 and the rollers 13 when one of the propelling members breaks or for some other reason becomes ineffective.

In some cases it is desirable to use two pairs of propelling members. This provides even greater security against functional interruption. Further, it reduces the load imposed to each individual propelling member.

When four propelling members are used, each pair of propelling members has its own bracket assembly as is illustrated in FIGS. 2 and 5. In a preferred arrangement the brackets 31 for one pair partially overlap the brackets for the other pair. In this case, the stabilizer fork 40a has a pair of the slots 41, one for each of the brackets. It will be recognized that a number of the brackets will be used with each drive frame, the number being dependent upon the length of the drive frame. The lengthwise spacing of the brackets is dependent upon the number necessary to adequately support the propelling members in drive position.

The invention provides a support for the propelling members which will keep both propelling members of a pair bearing against the rollers with substantially equal force because any increase in force on one propelling member will be relieved by transmitting a portion of it to the other propelling member so that the forces remain balanced. Further, this function is executed automatically, eliminating all necessity for the intervention of an operator.

It will be recognized that while this invention has been illustrated and described as applied to a conveyor having skewed rollers, a situation in which it is particularly useful, it can with equal advantage be applied to a power driven roller conveyor in which the rollers are normal to the main axis of the conveyor and, thus, the drive frames parallel with the side frame members.

It will be recognized that while it is particularly useful as a means of assuring the application of an adequate driving force to the rollers of a powered roller conveyor, it is entirely possible to apply this invention to a conveyor in which the propelling members are at the transport surface of the conveyor and, thus, make direct contact with the articles being propelled. In this case, the floating feature of the brackets provides a means for permitting the vertical position of the propelling members to adjust automatically to compensate for irregularities in the bottom surface of the articles being moved along the conveyor. This arrangment has a number of advantages when the articles are quite irregular. Other modifications and changes may be made without departing from the principles of the invention and such modifications are to be considered as included in the hereinafter pended claims unless these claims by their language expressly state otherwise.

The embodiments of the invention in which an exclusive property or privilege is claimed are defined as follows.

1. In a roller conveyor, having a pair of endless parallel, spaced propelling members driven in the same direction by a common power source, means for supporting said propelling members from beneath and holding them in driving engagement with the rollers of said conveyor, said means characterized by a bracket; said bracket having an upstanding center member elongated parallel to said propelling members; two pairs of said pulleys mounted on said center member, one pair at each end thereof; a foot plate extending on each side of said center member at each of its ends; a resilient means beneath each of said foot plates on each side of said center member; supporting said bracket for rocking movement normal to the axes of said propelling members whereby substantially uniform upward pressure is maintained against both of said propelling members.

2. A roller conveyor as described in claim 1 further characterized in that said resilient means are compression springs.

3. A roller conveyor as described in claim 1 further characterized in that stop means is provided for limiting the rocking movement of said bracket.

4. A roller conveyor as described in claim 3 further characterized in that said stop means has a pair of spaced walls, one on each side of said center member for limiting lateral movement of said member.

5. A roller conveyor as described in claim 3 further characterized in that said stop means is a plate rigidly secured to said conveyor and extending normal to the axes of said propelling members; said plate having a blind slot therein opening through one edge thereof, said slot being substantially wider than the thickness of said center member; said center member being received in and normally centered with respect to said slot.

6. A roller conveyor as described in claim 5 further characterized in that said propelling members are of circular cross section polyurethane.

7. A roller conveyor as described in claim 5 further characterized in that said propelling members are cables.

8. In a conveyor, having a pair of endless parallel, spaced propelling members driven in the same direction by a common power source, means for supporting said propelling members from beneath and holding them in article propelling positon, said means characterized by a bracket; said bracket having an upstanding center member elongated parallel to said propelling members; a pair of pulleys rotatably mounted on said center member, one beneath each of said propelling members; resilient means supporting said bracket for rocking movement normal to the axes of said propelling members a foot plate extending on each side of said center member at each of its ends; one of said resilient means beneath each of said foot plates on each side of said center member whereby substantially uniform upward pressure is maintained against both of said propelling members.

9. A support member for a pair of power driven cables of a conveyor, said cables being parallel and spaced, said support member characterized by a bracket; said bracket having an upstanding center member elongated parallel to said cables; two pairs of said pulleys mounted on said center member, one pair at each end thereof; a foot plate extending on each side of said center member at each of its ends; a resilient means beneath each of said foot plates on each side of said center member supporting said bracket for rocking movement normal to the axes of said cables whereby substantially uniform upward pressure is maintained against both of said cables.

10. In a conveyor, having a pair of endless parallel, spaced propelling members driven in the same direction by a common power source, means for supporting said propelling members from beneath and holding them in article propelling position, said means characterized by a bracket having a rigid upstanding center member; an axle rigidly secured to said bracket adjacent the top of said center member and extending from each side thereof; a pair of pulleys rotatably mounted, one on each end of said axle, each pulley being beneath one of said propelling members; resilient means supporting said bracket for rocking movement normal to the axes of said propelling members whereby substantially uniform upward pressure is maintained against both of said propelling members; means for limiting the rocking movement of said bracket.

11. A conveyor as described in claim 10 further characterized in that a pair of said axles are provided, one at each end of said bracket, a pair of said pulleys on each of said axles.

12. A conveyor as described in claim 11 further characterized in that four of said resilient means are provided, one adjacent each of said pulleys.

* * * * *